United States Patent Office 3,389,165
Patented June 18, 1968

3,389,165
PROCESS OF PRODUCING β-ARYLAMINO CINNAMOYL COMPOUNDS
Kenneth Wayne Ratts, Creve Coeur, Mo., assignor to Monsanto Company, St. Louis, Mo., a corporation of Delaware
No Drawing. Filed June 28, 1965, Ser. No. 467,722
11 Claims. (Cl. 260—471)

ABSTRACT OF THE DISCLOSURE

This invention relates to alkyl β-arylamino cinnamates and N-aliphatic or N,N-dialiphatic β-arylamino cinnamides, which compounds are useful as insecticides and fungicides.

This invention relates to new and useful sulfonium halides and to new and useful β-arylamino cinnamoyl derivatives thereof.

The sulfonium halides of this invention can be represented by the general formula

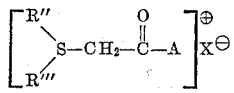

wherein X is halogen of atomic weight in the range of 35 to 127 (i.e. chlorine, bromine or iodine), wherein R″ and R‴ are like or unlike lower alkyl (i.e. methyl, ethyl, propyl, butyl, and the various isomeric forms thereof containing up to and including four carbon atoms), and wherein A is either lower alkoxy (e.g. methoxy, ethoxy, propoxy, butoxy, and the various isomeric forms thereof containing up to and including four carbon atoms) or, and preferably,

R—N—R′ wherein R is lower alkyl or lower alkenyl or lower alkoxyalkyl (e.g. methyl, ethyl, propyl, butyl, allyl, butenyl, methoxyethyl, ethoxyethyl, methoxypropyl, and the various isomeric forms thereof containing up to and including four carbon atoms) and wherein R′ is hydrogen or lower alkyl or lower alkenyl or lower alkoxyalkyl (e.g. methyl, ethyl, propyl, butyl, allyl, butenyl, methoxyethyl, ethoxyethyl, methoxypropyl, and the various isomeric forms thereof containing up to and including four carbon atoms). It is preferred that X be chlorine, that R″ and R‴ be $C_{1-2}$ alkyl (i.e. methyl or ethyl) and that both R and R′ be either like lower n-alkyl or like lower n-alkenyl. This preferred group is particularly useful as foliage fungicides, as for example controlling *Venturia inaequalis* (apple scab).

The sulfonium chlorides and bromides of this invention are prepared by reacting a sulfide of the formula R″—S—R‴, wherein R″ and R‴ have the aforedescribed significance, with a substantially equimolecular proportion of an α-haloaceto compound of the formula

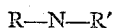

wherein Z is chlorine or bromine and wherein A has the aforedescribed significance, in a fluid system (i.e. a reaction temperature above the freezing point of the system up to and including the reflux temperature of the system or the decomposition temperature of the sulfonium halide). Where and when desired an inert organic solvent can be used, e.g. benzene, toluene, xylene, hexane, heptane, octane, and the like. The sulfonium iodides are prepared by mixing potassium iodide with a concentrated aqueous solution of the appropriate sulfonium chloride in substantially equimolecular proportions at room temperature, the sulfonium iodide product being less water-soluble than the sulfonium chloride reactant precipitates out and is recovered by simple filtration. Exemplary of the sulfide reactants are dimethyl sulfide, diethyl sulfide, di-n-propyl sulfide, diisopropyl sulfide, di-n-butyl sulfide, methylethyl sulfide, ethylisopropyl sulfide, butylmethyl sulfide, and the like. Exemplary of the α-haloaceto compound reactants are N,N-dimethyl-α-chloroacetamide,
N,N-diethyl-α-chloroacetamide,
N,N-diisopropyl-α-chloroacetamide,
N-methyl-α-chloroacetamide,
N-ethyl-α-chloroacetamide,
N-allyl-α-chloroacetamide,
N,N-diallyl-α-chloroacetamide,
N-allyl-N-methyl-α-chloroacetamide,
N-methyl-N-isopropyl-α-chloroacetamide,
N,N-di(2-methoxyethyl)-α-chloroacetamide,
N,N-di(2-ethoxyethyl)-α-chloroacetamide,
N-(2-ethoxyethyl)-α-chloroacetamide,
N-n-butyl-α-chloroacetamide,
N,N-di-n-butyl-α-chloroacetamide, and the like, and the corresponding α-bromoacetamides, and methyl α-chloroacetate, ethyl α-chloroacetate, isopropyl α-chloroacetate, n-butyl α-chloroacetate, isobutyl α-chloroacetate, and the like, and the corresponding α-bromoacetates.

The sulfonium halides of this invention are useful in preparing β-arylamino cinnamoyl compounds of the general formula

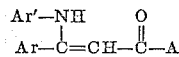

wherein A has the aforedescribed significance and preference, and wherein Ar and Ar′ are like or unlike aryl having from 6 to 10 carbon atoms such as phenyl, alkylphenyl (e.g. tolyl, xylyl, ethylphenyl, cumyl, cymenyl, butylphenyl, and the various isomeric forms thereof), and alkoxyphenyl (e.g. anisyl, dimethoxyphenyl, phenethyl, diethoxyphenyl, propoxyphenyl, butoxyphenyl, and the various isomeric forms thereof). The β-arylamino cinnamides are fungicides while the β-arylamino cinnamoyl compounds are insecticidally active against mosquito larvae.

The β-arylamino cinnamoyl compounds of this invention are prepared by initially reacting substantially equimolecular proportions of sodium hydride and a sulfonium halide of the aforedescribed formula under anhydrous conditions in the presence of tetrahydrofuran under a nitrogen atmosphere until an approximately equimolecular amount of hydrogen evolves, and thereafter adding to the reaction mass so obtained under a nitrogen atmosphere a substantially equimolecular amount of a Schiff's base of the formula ArCH=NAr′ wherein A and Ar′ have the aforedescribed significance. In the reaction between the sulfonium halide and sodium hydride temperatures in the range of from about 10° C. to about 30° C. will be employed. In the reaction involving the Schiff's base any temperature can be employed which provides a fluid system (i.e. a reaction temperature above the freezing point of the system up to and including the reflux temperature of the system). Exemplary of the Schiff's base reactants are benzalaniline, N-(p-methoxybenzylidene)aniline, N-(m-methoxybenzylidene)aniline, N-(m,p-dimethoxybenzylidine)-aniline, N-(p-ethoxybenzylidene)aniline, N-m,p-diethoxybenzylidene)aniline, N-(p-methylbenzylidene)aniline, N-(m,m′-dimethylbenzylidene)aniline, N-(p-tert. butylbenzylidene)aniline, benzal-o-toluidine, benzal-p-anisidine, benzal-p-phenetidine, benzal-m,p-dimethoxyaniline, benzal-p-methoxy-o-toluidine, N-(m,p-dimethoxybenzylidene)-o-toluidine, N-(p-methoxybenzylidene) - p - phenetidine, N-(m-methylbenzylidene)-m,m'-xylidine, and the like.

As illustrative of this invention but not limitative thereof is the following:

Example I

To a suitable reaction vessel equipped with a thermometer and agitator 75.1 parts by weight (substantially 1.2 moles) of dimethyl sulfide and 149.6 parts by weight (substantially 1.0 mole) of N,N-diethyl-α-chloroacetamide. The so charged mass is heated at about 40° C. for fourteen hours, filtered and the filter cake dried under anhydrous nitrogen to give 98.9 parts by weight of dimethyl(N,N-diethylcarbamoylmethyl)-sulfonium chloride

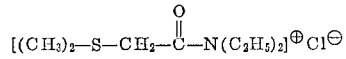

which melts at 146–147.5° C.

Example II

To a suitable reaction vessel equipped with a vent, thermometer and agitator is charged 12.0 parts by weight (substantially 0.05 mole) of dimethyl(N,N-diethylcarbamoylmethyl)-sulfonium chloride and 350 parts by weight of anhydrous tetrahydrofuran. While agitating the so charged mass under a nitrogen atmosphere there is added 2.3 parts by weight (substantially 0.05 mole) of sodium hydride in the form of a 53% by weight dispersion in mineral oil. The system is immediately connected to a gas meter to observe the evolution of hydrogen. After agitating for about two hours at room temperature approximately 0.1 part by weight (substantially 0.05 mole) of hydrogen evolved. To the resulting reaction mass and while agitating under a nitrogen atmosphere is added 10.5 parts by weight (substantially 0.05 mole) of N-(p-methoxybenzylidene)aniline. After agitating for one hour at room temperature the mass is then heated at about 60° C. for one hour, whereupon the mass is cooled to room temperature and filtered. The filtrate is evaporated in vacuo and the yellow oily residue crystallized from petroleum ether to give 10.5 parts by weight of β-anilino-N,N-diethyl-p-methoxycinnamide

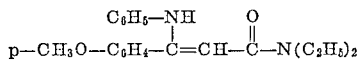

which melts at 108–110° C.

Example III

Employing the procedure of Example I but replacing N,N-diethyl-α-chloroacetamide with an equimolecular amount of N,N-diethyl-α-bromoacetamide there is obtained dimethyl (N,N-diethylcarbamoylmethyl)sulfonium bromide.

Example IV

Employing the procedure of Example II but replacing N-(p-methoxybenzylidene)aniline with an equimolecular amount of N-(m,m'-dimethylbenzylidene)aniline there is obtained β-anilino-N,N-diethyl-m,m'-dimethylcinnamide.

Example V

Employing the procedure of Example II but replacing N-(p-methoxybenzylidene)aniline with an equimolecular amount of benzalaniline [sometimes termed N-(benzylidene)aniline] there is obtained β-anilino-N,N-diethylcinnamide which melts at 91–92° C.

Example VI

Employing the procedure of Example I but replacing N,N-diethyl-α-chloroacetamide with an equimolecular amount of N,N-diallyl-α-chloroacetamide there is obtained dimethyl(N,N-diallylcarbamoylmethyl)sulfonium chloride which melts at 120–121° C.

Example VII

Employing the procedure of Example II but replacing dimethyl(N,N-diethylcarbamoylmethyl)sulfonium chloride and N-(p-methoxybenzylidene)aniline, respectively, with equimolecular proportions of dimethyl(N,N-diallylcarbamoylmethyl)sulfonium chloride and benzalaniline there is obtained β-anilino-N,N-diallylcinnamide which melts at 90–91° C.

Example VIII

Employing the procedure of Example I but replacing N,N - diethyl-α-chloroacetamide with an equimolecular amount of N-n-propyl-α-chloroacetamide there is obtained dimethyl(N - n-propylcarbamoylmethyl)sulfonium chloride, a solid of hygroscopic nature.

Example IX

Employing the procedure of Example II but replacing dimethyl(N,N - diethylcarbamoylmethyl)sulfonium chloride with an equimolecular amount of dimethyl(N - n-propylcarbamoylmethyl)sulfonium chloride there is obtained β-anilino-N-n-propyl-p-methoxycinnamide.

Example X

Employing the procedure of Example II but replacing dimethyl(N,N - diethylcarbamoylmethyl)sulfonium chloride and N-(p-methoxybenzylidene)aniline, respectively, with equimolecular proportions of dimethyl(N-n-propylcarbamoylmethyl)sulfonium chloride and benzalaniline there is obtained β - anilino - N - n - propylcinnamide which melts at 112–113° C.

Example XI

Employing the procedure of Example I but replacing N,N-diethyl-α-chloroacetamide with an equimolecular amount of ethyl α-bromoacetate there is obtained dimethyl(ethoxycarbonylmethyl)sulfonium bromide

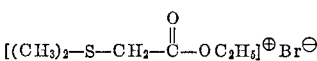

which melts at 85–87° C.

Example XII

Employing the procedure of Example II but replacing dimethyl(N,N - diethylcarbamoylmethyl)sulfonium chloride and N - (p - methoxybenzylidene), respectively, with equimolecular proportions of dimethyl(ethoxycarbonylmethyl)sulfonium bromide and benzalaniline there is obtained ethyl β-anilinocinnamate

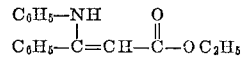

which melts at 67–68° C.

Example XIII

Employing the procedure of Example I but replacing N,N - diethyl-α-chloroacetamide with an equimolecular amount of isopropyl α-chloroacetate there is obtained dimethyl(isopropoxycarbonylmethyl)sulfonium chloride.

Example XIV

Employing the procedure of Example II but replacing dimethyl(N,N - diethylcarbamoylmethyl)sulfonium chloride with an equimolecular amount of dimethyl(isopropoxycarbonylmethyl)sulfonium chloride there is obtained isopropyl β-anilino-p-methoxycinnamate.

Example XV

To a concentrated aqueous solution of dimethyl(N,N-diallylcarbamoylmethyl)sulfonium chloride is added in small increments an equimolecular amount of potassium iodide while agitating at room temperature. The mass is filtered and the filter cake dried under anhydrous nitrogen to give dimethyl(N,N-diallylcarbamoylmethyl)sulfonium iodide which melts at 103–105° C.

Example XVI

Employing the procedure of Example XV but replacing dimethyl(N,N - diallylcarbamoylmethyl)sulfonium chloride with an equimolecular amount of dimethyl(N,N-diethylcarbamoylmethyl)-sulfonium chloride there is obtained dimethyl(N,N - diethylcarbamoylmethyl)sulfonium iodide.

Example XVII

Employing the procedure of Example XV but replacing dimethyl(N,N - diallylcarbamoylmethyl)sulfonic chloride with an equimolecular amount of dimethyl(ethoxycarbonylmethyl)sulfonium bromide there is obtained dimethyl(ethoxycarbonylmethyl)sulfonium iodide.

Example XVIII

Employing the procedure of Example I but replacing N,N - diethyl - α - chloroacetamide with an equimolecular amount of N - allyl - α -chloroacetamide there is obtained dimethyl(N - allylcarbamoylmethyl)sulfonium chloride.

Example XIX

Employing the procedure of Example I but replacing dimethyl sulfide with an equimolecular amount of diethyl sulfide there is obtained diethyl(N,N-diethylcarbamoylmethyl)sulfonium chloride.

Example XX

Employing the procedure of Example I but replacing dimethyl sulfide with an equimolecular amount of n-butylmethyl sulfide (i.e. n—C$_4$H$_9$—S—CH$_3$) there is obtained n - butylmethyl(N,N-diethylcarbamoylmethyl)sulfonium chloride

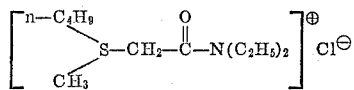

Example XXI

Employing the procedure of Example I but replacing N,N - diethyl-α-chloroacetamide with an equimolecular amount of N-methyl-N-isopropyl-α-chloroacetamide there is obtained dimethyl (N - methyl - N - isopropylcarbamoylmethyl)sulfonium chloride.

Example XXII

Employing the procedure of Example I but replacing N,N - diethyl - α - chloroacetamide with an equimolecular amount of N,N - di(2 - ethoxyethyl) - α - chloroacetamide there is obtained dimethyl[N,N - di(2 - ethoxyethyl)carbamoylmethyl]sulfonium chloride.

Example XXIII

Employing the procedure of Example II but replacing N-(p-methoxybenzylidene)aniline with an equimolecular amount of benzal-p-anisidine there is obtained β-p-anisidino-N,N-diethylcinnamide

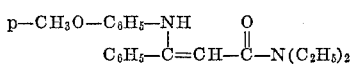

Example XXIV

Employing the procedure of Example II but replacing N-(p-methoxybenzylidene)aniline with an equimolecular amount of benzal-p-methoxy-o-toluidine there is obtained β-(p-methoxy-o-toluidino)-N,N-diethylcinnamide.

Example XXV

Employing the procedure of Example II but replacing N-(p-methoxybenzylidene)aniline with an equimolecular amount of N-(p-ethoxybenzylidene)-p-toluidine there is obtained β-(p-toluidino)-N,N-diethyl-p-ethoxycinnamide.

Example XXVI

Employing the procedure of Example II but replacing dimethyl(N,N - diethylcarbamoylmethyl)sulfonium chloride with an equimolecular amount of dimethyl(N-allyl-carbamoylmethyl)sulfonium chloride there is obtained β-anilino-N-allyl-p-methoxycinnamide.

Example XXVII

Employing the procedure of Example II but replacing dimethyl(N,N - diethylcarbamoylmethyl)sulfonium chloride and N-(p-methoxybenzylidene)aniline, respectively, with equimolecular proportions of dimethyl(N-methyl-N - isopropylcarbamoylmethyl)-sulfonium chloride and benzalaniline there is obtained β-anilino-N-methyl-N-isopropylcinnamide.

Example XXVIII

Employing the procedure of Example II but replacing dimethyl(N,N - diethylcarbamoylmethyl)sulfonium chloride and N-(p-methoxybenzylidene)aniline, respectively, with equimolecular proportions of dimethyl[N,N-di(2-ethoxyethyl)carbamoylmethyl]sulfonium chloride and N-(m,p-dimethoxybenzylidene)aniline there is obtained β-anilino-N,N-di(2-ethoxyethyl)-m,p-dimethoxycinnamide.

Example XXIX

Employing the procedure of Example II but replacing dimethyl(N,N - diethylcarbamoylmethyl)sulfonium chloride and N-(p-methoxybenzylidene)aniline, respectively, with equimolecular proportions of dimethyl(N,N-diallylcarbamoylmethyl)sulfonium iodide and benzal-p-tert.butylaniline there is obtained β-(p-tert.butylanilino)-N,N-diallylcinnamide.

Example XXX

Employing the procedure of Example II but replacing dimethyl(N,N - diethylcarbamoylmethyl)sulfonium chloride and N-(p-methoxybenzylidene)aniline, respectively, with equimolecular proportions of dimethyl(ethoxycarbonylmethyl)sulfonium iodide and benzal - o - toluidine there is obtained ethyl β-(o-toluidino)-cinnamate.

Other sulfonium halides and β-arylamino cinnamoyl compounds which can be prepared in accordance with the procedures of this invention include dimethyl(N-methylcarbamoylmethyl)sulfonium chloride,
dimethyl(N-ethylcarbamoylmethyl)sulfonium chloride,
dimethyl(N-isopropylcarbamoylmethyl)sulfonium chloride,
dimethyl(N-isobutylcarbamoylmethyl)sulfonium chloride,
dimethyl(N-n-but-2-enylcarbamoylmethyl)sulfonium chloride.
dimethyl[N-(2-methoxyethyl)carbamoylmethyl]sulfonium chloride,
diethyl(N-n-propylcarbamoylmethyl)sulfonium chloride,
diethyl(N,n-dimethylcarbamoylmethyl)sulfonium chloride,
diethyl(N,N-diallylcarbamoylmethyl)sulfonium chloride,
diethyl(N,N-dibut-2-enylcarbamoylmethyl)sulfonium chloride,
diethyl(N,N-di-n-butylcarbamoylmethyl)sulfonium chloride,
diethyl(N-methyl-N-isopropylcarbamoylmethyl)sulfonium chloride,
methylethyl(N,N-diallylcarbamoylmethyl)sulfonium chloride,
methylethyl(N,N-dimethylcarbamoylmethyl)sulfonium chloride,
diisopropyl(N,N-diallylcarbamoylmethyl)sulfonium chloride,
di-n-butyl(N,N-diallylcarbamoylmethyl)sulfonium chloride,
dimethyl(methoxycarbonylmethyl)sulfonium chloride,
diethyl(ethoxycarbonylmethyl)sulfonium chloride,
methylethyl(ethoxycarbonylmethyl)sulfonium chloride,
methylethyl(isopropoxycarbonylmethyl)sulfonium chloride,
diisopropyl(methoxycarbonylmethyl)sulfonium chloride,
di-n-butyl(isobutoxycarbonylmethyl)sulfonium chloride, and the corresponding sulfonium bromides and sulfonium iodides;

β-anilino-N-methylcinnamide,
β-anilino-N-ethylcinnamide,
β-anilino-N-isopropylcinnamide,
β-anilino-N-n-butylcinnamide,
β-anilino-N,N-dimethylcinnamide,
β-anilino-N,N-dimethyl-p-ethoxycinnamide,
β-anilino-N,N-di-n-butylcinnamide,
β-anilino-N-allylcinnamide,
β-anilino-N-allyl-o-methylcinnamide,
β-anilino-N-(2-methoxyethyl)cinnamide,
β-anilino-N,N-di-n-propylcinnamide,
β-anilino-N,N-dibut-2-enylcinnamide,
β-(o-toluidino)-N,N-diallylcinnamide,
β-(p-anisidino)-N,N-diallylcinnamide,
β-(p-anisidino)-N,N-diallyl-p-isobutoxycinnamide,
β-(m-phenetidino)-N-allylcinnamide,
β-(m-phenetidino)-N-allyl-p-isopropylcinnamide,
β-(m-phenetidino)-N-isopropylcinnamide,
β-(p-isopropylanilino)-N,N-dimethylcinnamide,
β-(m,p-diethoxyanilino)-N,N-dimethylcinnamide,
β-(p-isobutoxyanilino)-N,N-di-n-propylcinnamide,
β-(o-anisidino)-N-(2-methoxyethyl)cinnamide,
β-(p-anisidino)-N-methyl-N-isopropylcinnamide,
β-(p-toluidino)-N-methyl-N-isopropylcinnamide,
methyl β-anilinocinnamate,
ethyl β-anilino-p-isopropylcinnamate,
isopropyl β-anilinocinnamate,
isopropyl β-anilino-m-ethoxycinnamate,
n-butyl β-anilinocinnamate,
methyl β-(m-anisidino)cinnamate,
ethyl β-(p-phenetidino)cinnamate,
methyl β-(m,p-dimethoxyanilino)cinnamate,
ethyl β-(p-isobutoxyanilino)cinnamate, and the like.

The effectiveness of the compounds of this invention as fungicides is illustrated below.

*Slide germination tests.*—By the slide germination test the concentration of the compound to be evaluated required to inhibit complete germination of spores from 7- to 10-day old cultures of *Venturia inaequalis* is determined. 1.0 gram of the compound (below itemized) is dissolved in acetone to make a concentrated solution thereof and thereto is added and intimately mixed 0.1 gram of sorbitan monolaurate polyoxyethylene derivative (a commercial water-soluble non-ionic emulsifying agent). Thereto is added and intimately mixed sufficient water to provide an aqueous emulsion containing 10 p.p.m. of the compound. To a test tube is then added four volumes of the aqueous emulsion and one volume of spore stimulant and one volume of spore suspension, the spore stimulant being added to insure a high and relatively stable percentage of germination in the control. Drops of the test specimen mixture and an untreated control are pipetted onto glass slides. The glass slides are then placed in moist chambers for 20 hours incubation at 22° C. Germination counts are made by counting 100 potentially viable spores, i.e. those spores which would germinate under the normal conditions of the control. The results were as follows:

| Compound: | Germination |
|---|---|
| Dimethyl(N,N - diallylcarbamoylmethyl)sulfonium bromide | None |
| Dimethyl(N,N - diallylcarbamoylmethyl)sulfonium iodide | Do. |
| Dimethyl(N,N - diallylcarbamoylmethyl)sulfonium chloride | Do. |
| Dimethyl(N - n - propylcarbamoylmethyl)sulfonium chloride | Do. |
| β-Anilino-N,N-diethylcinnamide | Do. |
| β-Anilino-N,N-diallylcinnamide | Do. |
| Control | Complete |

In a similar evaluation against the late blight fungus *Phytophthora infestans* at respective concentrations of 10 p.p.m. dimethyl(N,N - diallylcarbamoylmethyl)sulfonium bromide, dimethyl(N - n - propylcarbamoylmethyl sulfonium chloride and β-anilino-N,N-diethylcinnamide, respectively, completely prevented germination of spores of said fungus.

With respect to the soil fungus *Pythium ultimum* at a concentration of 30 p.p.m. dimethyl(N,N-diallylcarbamoylmethyl)sulfonium bromide and β-anilino-N,N-diethyl-p-methoxycinnamide, respectively, exhibited complete control of the said soil fungus.

As aforementioned the alkyl β-arylamino cinnamates of this invention effectively control mosquito larvae. For example at a concentration of 10 p.p.m. ethyl β-anilinocinnamate exhibited a 90% kill of yellow fever mosquito larvae, *Aedes aegypti*.

The exact concentration of the fungicidal or insecticidal agents of this invention employed in combatting or controlling fungi or insects can vary considerably provided the required dosage (i.e., a toxic amount) thereof is supplied to the respective organisms or to the environment of the organisms. When the extending agent is a liquid or mixture of liquids (e.g. as in solutions, suspensions, emulsions, or aerosols) the concentration of the fungicidal or insecticidal agent employed to supply the desired dosage generally will be in the range of 0.001 to 50 percent by weight. When the extending agent is a semi-solid or solid, the concentration of the fungicidal or insecticidal agent employed to supply the desired dosage generally will be in the range of 0.1 to 25 percent by weight. From a practical point of view, the manufacturer must supply the agriculturist with a low-cost concentrate or spray base or particulate solid base in such form that, by merely mixing with water or solid extender (e.g., powdered clay or talc) or other low-cost material available to the agriculturist at the point of use, he will have an easily prepared fungicidal or insecticidal spray or particulate solid. In such a concentrate composition, the fungicidal or insecticidal agent generally will be present in a concentration of 5 to 95 percent by weight, the residue being any one or more of the well-known fungicidal or insecticidal adjuvants, such as the various surface active agents (e.g., detergents, a soap or other emulsifying or wetting agent, surface-active clays), solvents, diluents, carrier media, adhesives, spreading agents, humectants, and the like.

In controlling or combatting fungal organisms or insects the fungicidal or insecticidal agents of this invention either per se or compositions comprising same are supplied to the fungi or insects or to their environment in a toxic amount. This can be done by dispersing the new fungicidal or insecticidal agent or fungicidal or insecticidal composition comprising same in, on or over an infested environment or in, on or over an environment the fungi or insects frequent, e.g. agricultural soil or other growth media or other media infested with the fungi or insects, or attractable to the fungi or insects for habitational or sustenance or propagational purposes, in any conventional fashion which permits contact between the organisms and the fungicidal or insecticidal agents of this invention. Such dispersing can be brought about by applying the fungicidal agent per se or sprays or particulate solid compositions containing same to a surface infested with the fungi or insects or attractable to same, as for example, the surface of agricultural soil or other media such as the above ground surface of plants by any of the conventional methods, e.g. power dusters, boom and hand sprayers, and spray dusters. Also for sub-surface application such dispersing can be carried out by simply mixing the new fungicidal or insecticidal agent per se or fungicidal or insecticidal spray or particulate solid compositions comprising same with the infested environment or with the environment the fungi or insects frequent, or by employing a liquid carrier for the new fungicidal or insecticidal agent to acomplish sub-surface penetration and impregnation therein.

What is claimed is:

1. A β-arylamino cinnamoyl compound of the general formula $$\begin{array}{c} Ar'-NH \quad\ O \\ | \qquad\quad \| \\ Ar-C=CH-C-A \end{array}$$

wherein Ar and Ar' are aryl having from 6 to 10 carbon atoms selected from the group consisting of phenyl, lower-alkyl substituted phenyl and lower-alkoxy substituted phenyl, and wherein A is selected from the group consisting of lower alkoxy and $$\begin{array}{c} R-N-R' \\ | \end{array}$$

wherein R is selected from the group consisting of lower alkyl, lower alkenyl and lower alkoxyalkyl and wherein R' is selected from the group consisting of hydrogen, lower alkyl, lower alkenyl and lower alkoxyalkyl.

2. A β-anilino-cinnamide of the formula $$\begin{array}{c} C_6H_5-NH \quad\ O \quad\ R \\ | \qquad\quad \| \quad / \\ C_6H_5-C=CH-C-N \\ \qquad\qquad\qquad\quad \backslash \\ \qquad\qquad\qquad\qquad R' \end{array}$$

wherein R and R' are like lower n-alkyl.

3. A β-anilino-cinnamide of the formula $$\begin{array}{c} C_6H_5-NH \quad\ O \quad\ R \\ | \qquad\quad \| \quad / \\ C_6H_5-C=CH-C-N \\ \qquad\qquad\qquad\quad \backslash \\ \qquad\qquad\qquad\qquad R' \end{array}$$

wherein R and R' are like lower n-alkenyl.

4. β-Anilino-N,N-diethylcinnamide
5. β-Anilino-N,N-diallylcinnamide
6. β-Anilino-N-n-propylcinnamide
7. β-Anilino-N,N-diethyl-p-methoxycinnamide
8. Ethyl β-anilinocinnamate 9. The method of making a β-arylamino cinnamoyl compound of the general formula $$\begin{array}{c} Ar'-NH \quad\ O \\ | \qquad\quad \| \\ Ar-C=CH-C-A \end{array}$$

wherein Ar and Ar' are aryl having from 6 to 10 carbon atoms selected from the group consisting of phenyl, lower-alkyl substituted phenyl and lower alkoxy substituted phenyl, and wherein A is selected from the group consisting of lower alkoxy and $$\begin{array}{c} R-N-R' \\ | \end{array}$$

wherein R is selected from the group consisting of lower alkyl, lower alkenyl and lower alkoxyalkyl and wherein R' is selected from the group consisting of hydrogen, lower alkyl, lower alkenyl and lower alkoxyalkyl, which comprises initially bringing together and reacting under anhydrous conditions at from about 10° C. to about 30° C. substantially equimolecular proportions of sodium hydride and a sulfonium halide of the general formula $$\left[\begin{array}{c} R' \\ \backslash \\ \quad S-CH_2-\overset{O}{\overset{\|}{C}}-A \\ / \\ R'' \end{array}\right]^{\oplus} X^{\ominus}$$

wherein A has the same significance as above, wherein R' and R" are lower alkyl and wherein X is halogen of atomic weight in the range of 35 to 127, until approximately an equimolecular proportion of hydrogen evolves, and then to the reaction mass so obtained adding and reacting a substantially equimolecular proportion of a Schiff's base of the formula ArCH=NAr' wherein Ar and Ar' have the same significance as above.

10. The method of making a β-anilino-cinnamide of the formula $$\begin{array}{c} C_6H_5-NH \quad\ O \quad\ R \\ | \qquad\quad \| \quad / \\ C_6H_5-C=CH-C-N \\ \qquad\qquad\qquad\quad \backslash \\ \qquad\qquad\qquad\qquad R' \end{array}$$

wherein R and R' are like lower n-alkyl which comprises initially bringing together and reacting under anhydrous conditions at from about 10° C. to about 30° C. substantially equimolecular proportions of sodium hydride and a sulfonium chloride of the general formula $$\left[\begin{array}{c} R'' \\ \backslash \\ \quad S-CH_2-\overset{O}{\overset{\|}{C}}-N \\ / \qquad\qquad\qquad \backslash \\ R''' \qquad\qquad\qquad R' \end{array}\begin{array}{c} R \\ / \\ \\ \end{array}\right]^{\oplus} Cl^{\ominus}$$

wherein R" and R'" are $C_{1-2}$ alkyl and wherein R and R' have the above described significance until approximately an equimolecular proportion of hydrogen evolves, and then to the reaction mass so obtained adding and reacting a substantially equimolecular proportion of benzalaniline.

11. The method of making a β-anilino-cinnamide of the formula $$\begin{array}{c} C_6H_5-NH \quad\ O \quad\ R \\ | \qquad\quad \| \quad / \\ C_6H_5-C=CH-C-N \\ \qquad\qquad\qquad\quad \backslash \\ \qquad\qquad\qquad\qquad R' \end{array}$$

wherein R and R' are like lower n-alkenyl which comprises initially bringing together and reacting under anhydrous conditions at from about 10° C. to about 30° C. substantially equimolecular proportions of sodium hydride and a sulfonium chloride of the general formula $$\left[\begin{array}{c} R'' \\ \backslash \\ \quad S-CH_2-\overset{O}{\overset{\|}{C}}-N \\ / \qquad\qquad\qquad \backslash \\ R''' \qquad\qquad\qquad R' \end{array}\begin{array}{c} R \\ / \\ \\ \end{array}\right]^{\oplus} Cl^{\ominus}$$

wherein R" and R'" are $C_{1-2}$ alkyl and wherein R and R' have the above described significance until approximately an equimolecular proportion of hydrogen evolves, and then to the reaction mass so obtained adding and reacting a substantially equimolecular proportion of benzalaniline.

References Cited
UNITED STATES PATENTS

| | | | |
|---|---|---|---|
| Re. 24,960 | 4/1961 | Urbschat | 167—30 |
| 2,797,241 | 6/1957 | Brown | 260—562 |
| 2,851,494 | 9/1958 | Ehrhart | 260—562 |
| 2,403,495 | 7/1946 | Bowen | 167—30 |

OTHER REFERENCES

Journal of American Chemical Society, by Speziale et al., vol. 87, pp. 3460–3462 (1965).

LORRAINE A. WEINBERGER, *Primary Examiner.*

J. S. LEVITT, *Examiner.*

S. FRIEDMAN, L. THAXTON, *Assistant Examiners.*